(12) United States Patent
Zhang et al.

(10) Patent No.: US 12,434,667 B2
(45) Date of Patent: Oct. 7, 2025

(54) REAR WIPER ASSEMBLY

(71) Applicant: Valeo Systemes d'Essuyage, La Verriere (FR)

(72) Inventors: Qiang Zhang, Shanghai (CN); Tieqiang Yao, Jiangsu (CN); Xu Cheng, Shanghai (CN)

(73) Assignee: Valeo Systemes d'Essuyage, La Verriere (FR)

( * ) Notice: Subject to any disclaimer, the term of this patent is extended or adjusted under 35 U.S.C. 154(b) by 0 days.

(21) Appl. No.: 18/254,571

(22) PCT Filed: Nov. 25, 2021

(86) PCT No.: PCT/CN2021/133064
§ 371 (c)(1),
(2) Date: Oct. 23, 2023

(87) PCT Pub. No.: WO2022/111572
PCT Pub. Date: Jun. 2, 2022

(65) Prior Publication Data
US 2024/0400000 A1    Dec. 5, 2024

(30) Foreign Application Priority Data

Nov. 26, 2020    (CN) .......................... 202022775726.6

(51) Int. Cl.
*B60S 1/34*    (2006.01)
*B60S 1/58*    (2006.01)

(52) U.S. Cl.
CPC ........... *B60S 1/3481* (2013.01); *B60S 1/3429* (2013.01); *B60S 1/3431* (2013.01); *B60S 1/345* (2013.01); *B60S 1/583* (2013.01); *B60S 1/3436* (2013.01)

(58) Field of Classification Search
CPC ...... B60S 1/3436; B60S 1/345; B60S 1/3431; B60S 1/3481; B60S 1/3479; B60S 1/3484; B60S 1/583; B60S 1/3425; B60S 1/3429

(Continued)

(56) References Cited

U.S. PATENT DOCUMENTS 2,860,364 A * 11/1958 Krohm .................. B60S 1/3481
                                                        15/250.34
2,860,365 A * 11/1958 Krohm ...................... B60S 1/34
                                                       15/250.352

(Continued)

FOREIGN PATENT DOCUMENTS

CN        2777916 Y     5/2006
CN      204586791 U     8/2015

(Continued)

OTHER PUBLICATIONS

Machine translation of description portion of German publication 2637126, published Feb. 1977. (Year: 1977).*

(Continued)

*Primary Examiner* — Gary K. Graham
(74) *Attorney, Agent, or Firm* — Valeo Systemes d'Essuyage (57) ABSTRACT

Provided is a rear wiper assembly having a rear wiper arm, a cover, a joint, and a motion-stopping mechanism. A connector and a cover are hingedly connected to the rear end of the rear wiper arm. When the cover is in a closed state, it covers the connector; the motion-stopping mechanism has a first interference element and a second interference element, at least one of the interference elements being a flexible element; the first interference element is arranged on the rear wiper arm, and the second interference element is arranged on the cover, when the cover is in an open state and when the angle between the upper surface of the cover and (Continued)

the upper surface of the rear wiper arm is within a predetermined range, the interference elements interfere with each other, preventing the cover from turning over in the direction of the connector.

11 Claims, 8 Drawing Sheets

(58) Field of Classification Search
USPC .................. 15/250.351, 250.352, 250.34
See application file for complete search history.

(56) References Cited

U.S. PATENT DOCUMENTS

| | | | | |
|---|---|---|---|---|
| 3,800,356 | A * | 4/1974 | Ito .............................. | B60S 1/34 15/250.34 |
| 4,502,178 | A * | 3/1985 | Ragot ..................... | B60S 1/344 15/250.34 |
| 6,665,903 | B2 * | 12/2003 | Tsukamoto ........... | B60S 1/3481 15/250.352 |
| 7,793,382 | B2 * | 9/2010 | Van De Rovaart ... | B60S 1/3481 15/250.34 |
| 2014/0182076 | A1 * | 7/2014 | Moll ..................... | B60S 1/3484 15/250.351 |
| 2014/0182077 | A1 | 7/2014 | Ju et al. | |
| 2020/0031317 | A1 * | 1/2020 | Charbonnier ............ | B60S 1/04 |

FOREIGN PATENT DOCUMENTS

| | | | | |
|---|---|---|---|---|
| CN | 209142082 | U | | 7/2019 |
| CN | 210139850 | U | | 3/2020 |
| CN | 210563940 | U | | 5/2020 |
| CN | 211335897 | U | | 8/2020 |
| DE | 2637126 | A1 | * | 2/1977 |
| DE | 19623597 | A1 | | 12/1997 |
| FR | 2607766 | A | * | 6/1988 ................ B60S 1/34 |
| JP | 2001301580 | A | | 10/2001 |
| JP | 2002002455 | A | * | 1/2002 ............ B60S 1/3481 |
| JP | 2006248329 | A | | 9/2006 |
| JP | 2007153153 | A | | 6/2007 |
| JP | 2017065447 | A | | 4/2017 |

OTHER PUBLICATIONS

Machine translation of description portion of Chinese publication 211335897, published Aug. 2020. (Year: 2020).*
International Search Report issued in International Patent Application No. PCT/CN2021/133064 mailed on Feb. 23, 2022 (8 pages).
Written Opinion issued in International Patent Application No. PCT/CN2021/133064 mailed on Feb. 23, 2022 (3 pages).
Japan Patent Office, Search Report (with English translation) of corresponding Japanese Patent Application No. 2023-532221, dated Apr. 12, 2024, 25 pages.
European Patent Office, Supplemental European Search Report of corresponding European Patent Application No. EP21897072, dated Sep. 9, 2024, 2 pages.
European Patent Office, Extended European Search Report of corresponding European Patent Application No. EP21897072, dated Sep. 24, 2024, 5 pages.

* cited by examiner

REAR WIPER ASSEMBLY

TECHNICAL FIELD

The present invention relates to the field of mechanical structures, in particular to a rear wiper assembly.

BACKGROUND OF THE INVENTION

In a motor vehicle, a rear wiper is usually installed on the rear windshield to sweep away rainwater or dust obstructing the driver's line of sight, thus ensuring the driver's rear field of view.

The rear wiper generally comprises a drive motor, a head connected to the drive motor, a rear wiper arm hinged at one end to the head, and a wiper blade attached near the other end of the rear wiper arm; thus, when the drive motor is operating, with the aid of the head and the rear wiper arm, the wiper blade can swing through a certain angle while remaining in close contact with the rear windshield, in order to wipe away rainwater or dust.

The head and the drive motor are usually connected by a nut. For aesthetic reasons, the rear wiper may also comprise a cover for covering the head and the nut. During assembly and maintenance, the cover can be flipped upward to open, but the cover in the prior art often cannot be kept in the open state, and turns downward very easily, thus interfering with an assembly/disassembly tool.

SUMMARY OF THE INVENTION

Therefore, the purpose of the present invention is to propose a rear wiper assembly, which can at least partly solve the problem mentioned above.

According to one aspect of the present invention, a rear wiper assembly is provided, comprising a rear wiper arm, a cover, a head and a stop mechanism, the head and the cover being hinged to a rear end of the rear wiper arm; when the cover is in a closed state, the cover can cover the head; the stop mechanism comprises a first interference element and a second interference element, at least one of the first interference element and the second interference element being an elastic element; the first interference element is disposed on the rear wiper arm, the second interference element is disposed on the cover, and when the cover is in an open state and an angle between an upper surface of the cover and an upper surface of the rear wiper arm is within a predetermined angular range, the first interference element and the second interference element interfere with each other, preventing the cover from flipping in the direction of the head.

According to embodiments of the present invention, by providing the stop mechanism, the cover can be prevented from flipping downward and covering the rear end of the rear wiper arm, or interfering with an assembly/disassembly tool, when the head is being fitted to or removed from the drive motor.

In some embodiments, a hinge shaft of the head and a hinge shaft of the cover are different.

In some embodiments, a hinge shaft is provided on the upper surface of the rear wiper arm, two claw-shaped parts extend perpendicularly from the upper surface of the cover, slots complementing the hinge shaft are provided in the claw-shaped parts, and rotation of the claw-shaped parts around the hinge shaft can drive the cover to flip.

In some embodiments, the first interference element is disposed on the hinge shaft, and the second interference element is disposed on the upper surface of the cover and located between the two claw-shaped parts.

In some embodiments, two U-shaped slots are provided in sidewalls of the rear wiper arm, and two cylindrical lugs are provided on two sides of the head, the U-shaped slots cooperating with the lugs such that the head is hinged to the rear wiper arm.

In some embodiments, the predetermined angular range is 85-90 degrees.

In some embodiments, the amount of interference between the first interference element and the second interference element is 0.2 mm.

In some embodiments, the first interference element has a triangular cross section, and the second interference element has a trapezoidal cross section.

In some embodiments, a hinge shaft of the head and a hinge shaft of the cover are the same.

In some embodiments, the rear wiper assembly further comprises: a wiper blade, the wiper blade being attached to the rear wiper arm; and a spring, the spring being connected between the rear wiper arm and the head.

In some embodiments, the rear wiper assembly further comprises: a drive motor, the head comprising a connecting hole for connecting to an output shaft of the drive motor.

BRIEF DESCRIPTION OF THE DRAWINGS

The abovementioned characteristics, technical features and advantages of the present invention and modes of implementation thereof are further explained below in a clear and easy-to-understand manner by describing preferred embodiments with reference to the drawings, wherein.

DETAILED DESCRIPTION OF THE INVENTION

Embodiments of the present invention are described by way of example below. As those skilled in the art should realize, the embodiments described may be modified in various ways without departing from the concept of the present invention. Thus, the accompanying drawings and the description are in essence demonstrative and non-limiting. In the following text, identical reference symbols generally indicate functionally identical or similar elements.

According to the general concept of the present invention, a rear wiper assembly is provided, comprising a rear wiper arm, a head, a cover and a stop mechanism, the head and the cover being hinged to a rear end of the rear wiper arm; when the cover is in a closed state, the cover can cover the head; the stop mechanism comprises a first interference element and a second interference element, at least one of the first interference element and the second interference element being an elastic element; the first interference element is disposed on the rear wiper arm, the second interference element is disposed on the cover, and when the cover is in an open state and an angle between an upper surface of the cover and an upper surface of the rear wiper arm is within a predetermined angular range, the first interference element and the second interference element interfere with each other, preventing the cover from flipping in the direction of the head.

Figure 1:
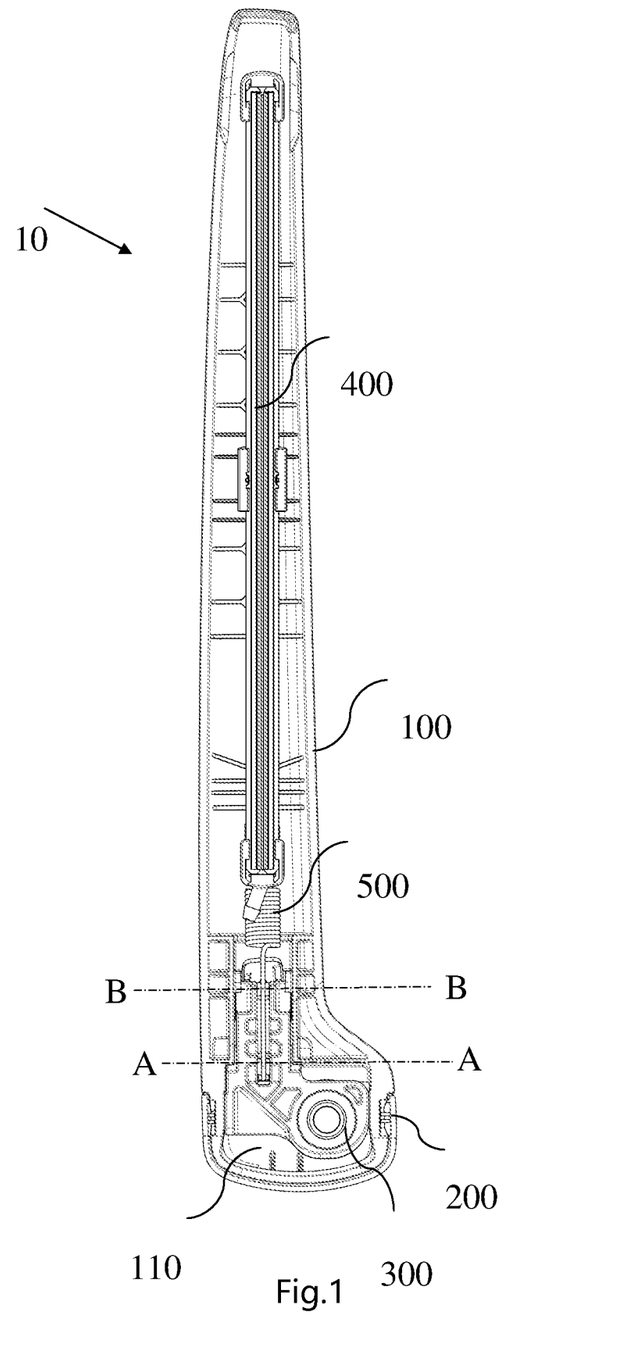
FIG. 1 is a bottom view of a rear wiper assembly 10 according to an embodiment of the present invention.

FIG. 1 shows a bottom view of a rear wiper assembly 10 according to an embodiment of the present invention. As shown in the figure, the rear wiper assembly 10 may comprise a rear wiper arm 100, a cover 200 and a head 300, wherein the head 300 is accommodated in a recess 110 at a rear end of the rear wiper arm 100, and is hinged to the rear end of the rear wiper arm 100 around a hinge axis A-A; the cover 200 is also hinged to the rear end of the rear wiper arm 100, but a hinge axis B-B thereof is different from the hinge axis A-A of the head 300; the cover 200 is in a closed state at this time, and at least partially surrounds the rear end of the rear wiper arm 100, thereby covering the head 300, while for aesthetic reasons, the contour of an outer surface of the cover 200 matches the contour of an outer surface of the rear wiper arm 100.

Figure 2:
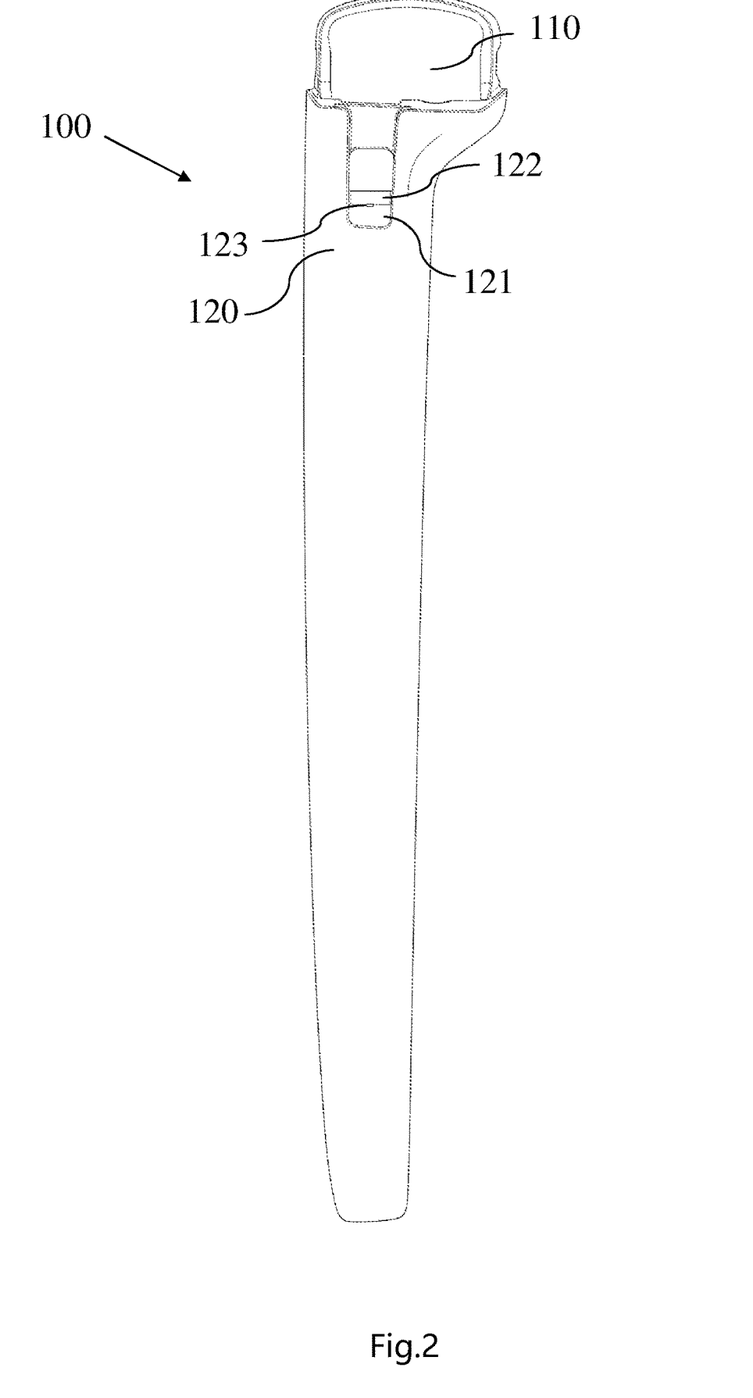
FIG. 2 is a top view of the rear wiper arm 100 in FIG. 1.
Figure 3:
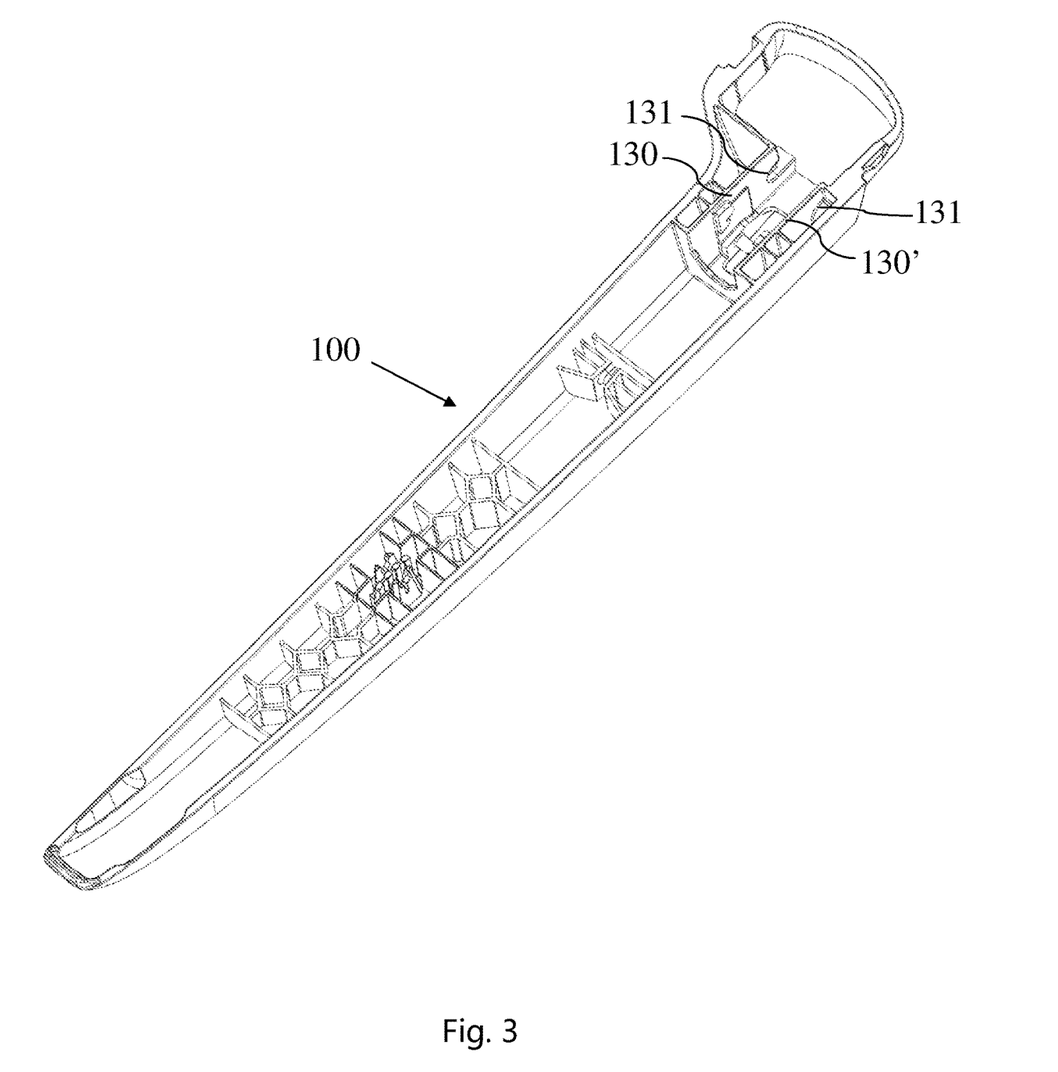
FIG. 3 is a bottom view of the rear wiper arm 100 in FIG. 1.

FIG. 2 and FIG. 3 respectively show a top view and a bottom view of the rear wiper arm 100 of FIG. 1. As shown in FIG. 2, a rectangular opening 121 is provided in an upper surface 120 of the rear end of the rear wiper arm 100; two side edges of the rectangular opening 121 are connected via a hinge shaft 122, and the hinge shaft 122 may be used to hinge-connect the cover 200. As shown in FIG. 3, U-shaped slots 131 are respectively provided in opposite sidewalls 130 and 130' of the rear end of the rear wiper arm 100, and may be used to hinge-connect the head 300.

Figure 4:
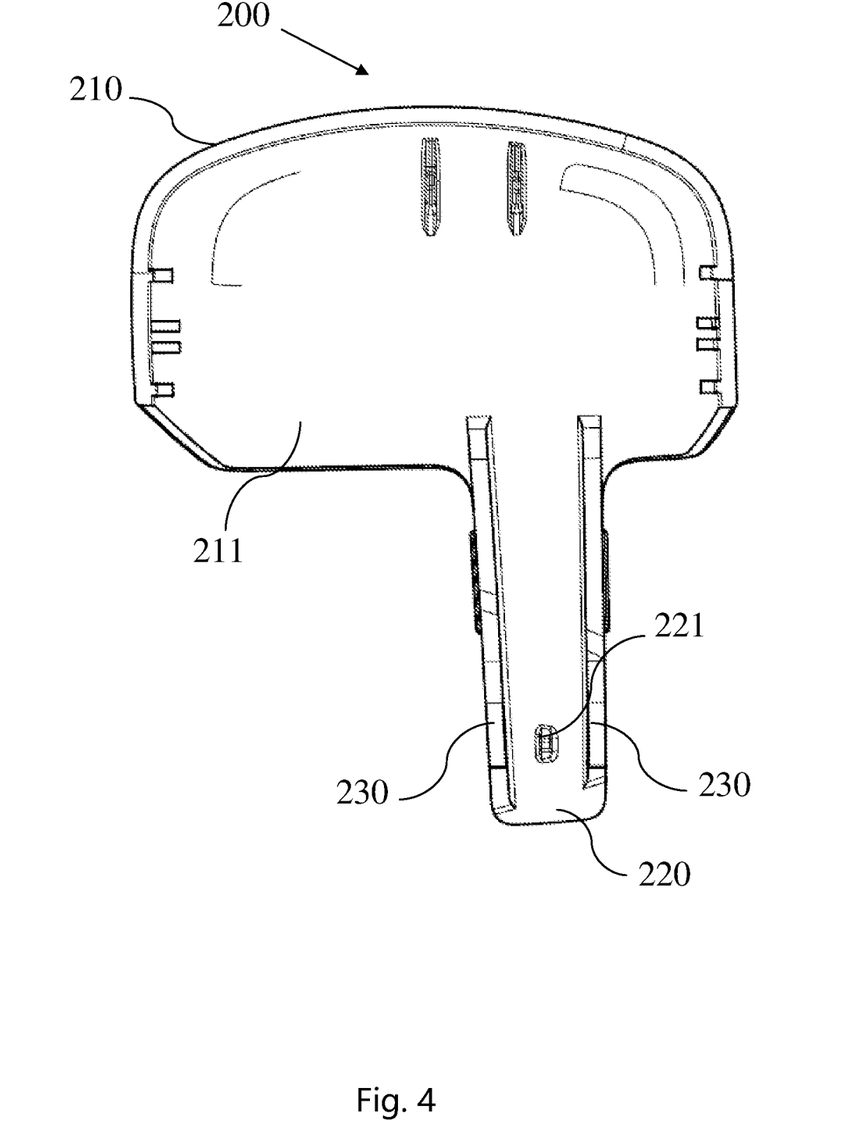
FIG. 4 is a bottom view of the cover 200 in FIG. 1.

FIG. 4 is a bottom view of the cover 200 of FIG. 1. As shown in the figure, the cover 200 comprises a main body part 210 and an extension part 220. The extension part 220 extends from an upper surface 211 of the main body part 210, i.e. the extension part 220 and the upper surface 211 of the main body part 210 form an upper surface of the cover 200. When the cover 200 is in a closed state, the main body part 210 can at least partially surround the rear end of the rear wiper arm 100 and cover the head 300; the shape and size of the extension part 220 match the shape and size of the rectangular opening 121 of the rear wiper arm 100. As shown in FIG. 4, the cover 200 also comprises two claw-shaped parts 230, which are arranged on two side edges of the extension part 220 and extend perpendicularly to the upper surface of the cover 200. Each claw-shaped part 230 is provided with a slot 231 complementing the hinge shaft 122 of the rear wiper arm 100, and rotation of the claw-shaped part 230 around the hinge shaft 122 can drive the cover 200 to flip. When the flip angle α of the cover 200 (i.e. the angle between the upper surface of the cover 200 and the upper surface 120 of the rear wiper arm 100) is small, for example, less than or equal to 90 degrees, the head 300 will flip downward very easily due to vibration, etc., thus covering the rear end of the rear wiper arm 100 or interfering with the assembly/disassembly tool, when the head 300 is being fitted to or removed from the drive motor.

In order to solve this problem, the rear wiper assembly 10 may further comprise a stop mechanism 700. As shown in FIGS. 2 and 4, the stop mechanism 700 comprises a first interference element 123 and a second interference element 221, the first interference element 123 being disposed on the hinge shaft 122 on the rear wiper arm 100, and the second interference element 221 being disposed on the extension part 220 of the cover 200 and located between the two claw-shaped parts 230. At least one of the first interference element 123 and the second interference element 221 is an elastic element.

Figure 5:
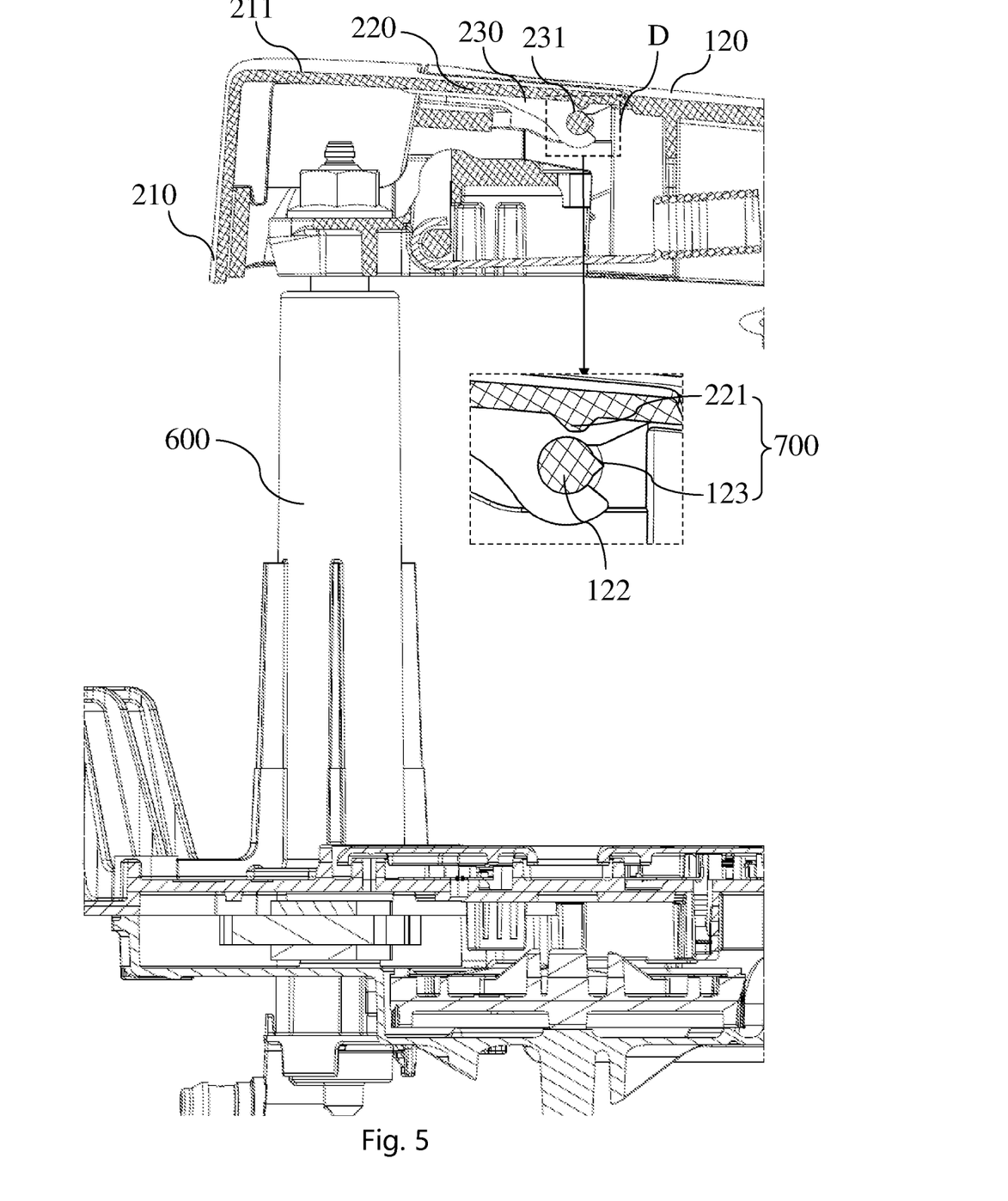
FIG. 5 is a sectional drawing of the rear wiper assembly 10 in FIG. 1 along a plane in which the first interference element 123 and the second interference element 221 lie, wherein the cover 200 is in a closed state.
Figure 6:
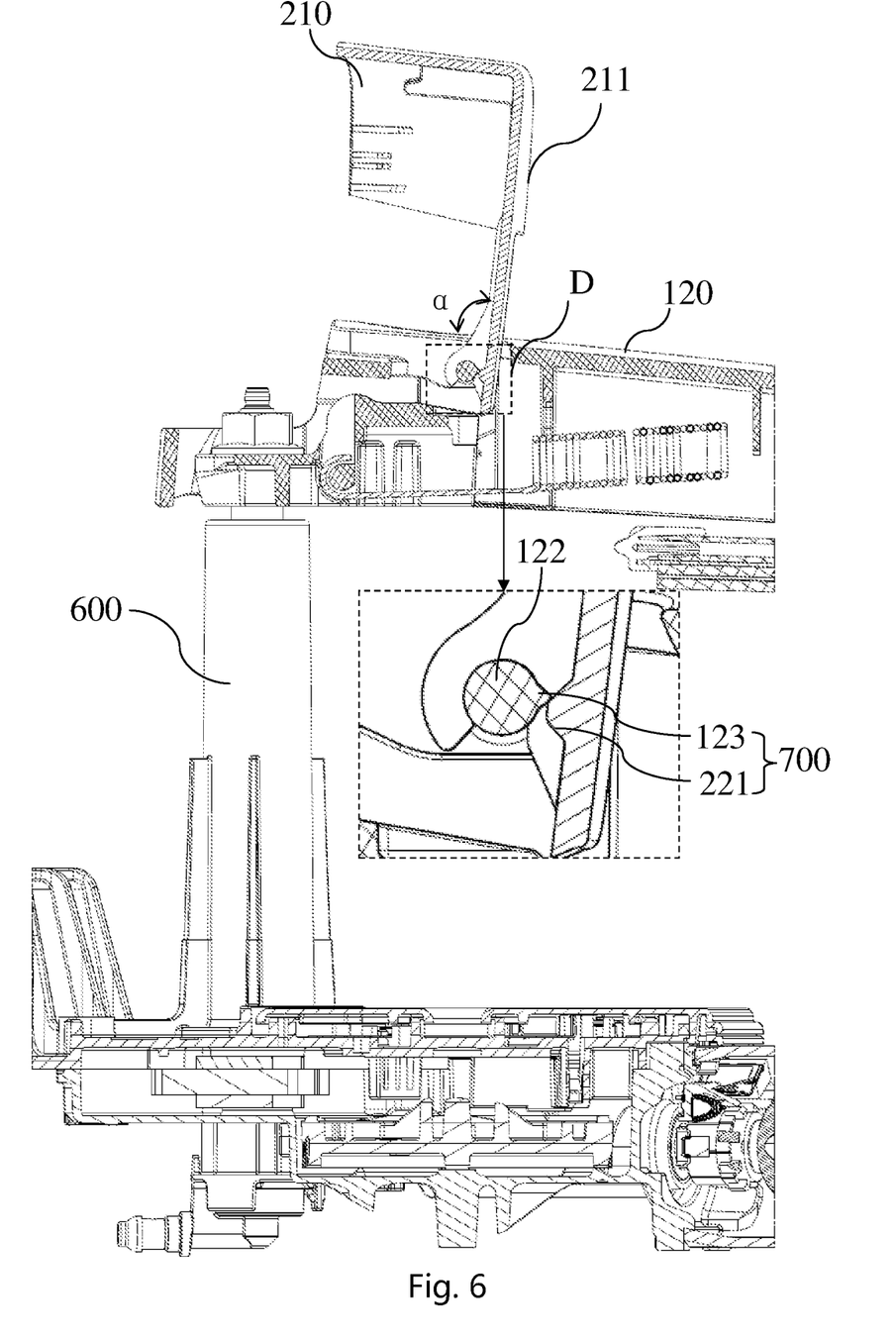
FIG. 6 is another sectional drawing of the rear wiper assembly 10 in FIG. 1 along a plane in which the first interference element 123 and the second interference element 221 lie, wherein the first interference element and the second interference element are in an interference state.

FIG. 5 is a sectional drawing of the rear wiper assembly 10 of FIG. 1 along a plane in which the first interference element 123 and the second interference element 221 lie, wherein the cover 200 is in a closed state. FIG. 6 is another sectional drawing of the rear wiper assembly 10 of FIG. 1 along a plane in which the first interference element 123 and the second interference element 221 lie, wherein the cover 200 is in an open state, and the first interference element 123 and the second interference element 221 are in an interference state. In the process of the flip angle α of the cover 200 slowly increasing from 0 degrees (i.e. the closed state), the second interference element 221 gradually approaches the first interference element 123; when the flip angle of the cover 200 is within a predetermined angular range, the first interference element 123 and the second interference element 221 interfere, and in this way the cover 200 can be prevented from flipping in the direction of the head during assembly/disassembly.

In an example, the abovementioned predetermined angular range is related to the sizes and positions of the first interference element 123 and the second interference element 221. Preferably, the abovementioned predetermined angular range may be close to the maximum flip angle of the cover 200, for example, but not limited to, 85-90 degrees.

In one example, the tightness of the interference between the first interference element 123 and the second interference element 221 can be changed by adjusting the amount of interference between the first interference element 123 and the second interference element 221. Here, the amount of interference means the length of overlapping parts of the two elements when the second interference element 221 has contacted the first interference element 123 but interference has not yet occurred. For example, but without limitation, the amount of interference between the first interference element 123 and the second interference element 221 is 0.2 mm. In addition, the tightness of interference between the first interference element 123 and the second interference element 221 can be adjusted so that when assembly/disassembly is complete, the interference force can be overcome to cover the rear end of the rear wiper arm 100 with the cover 200 without much effort.

In one example, as shown in FIGS. 5 and 6, the first interference element 123 has a triangular cross section, and the second interference element 221 has a trapezoidal cross section. It must be explained that the shapes of the first interference element 123 and the second interference element 221 are not limited to this, and may have any other shapes.

It must be explained that although the cover 200 and the head 300 are shown as having different hinge shafts in FIG. 1, in other embodiments the cover 200 and the head 300 may have the same hinge shaft. In this case, the position of the first interference element 123 on the hinge shaft 122 and the position of the second interference element 221 on the extension part 220 may change; for example, but without limitation, the first interference element 123 and the second interference element 221 may be located between the cover 200 and the head 300.

Figure 7:
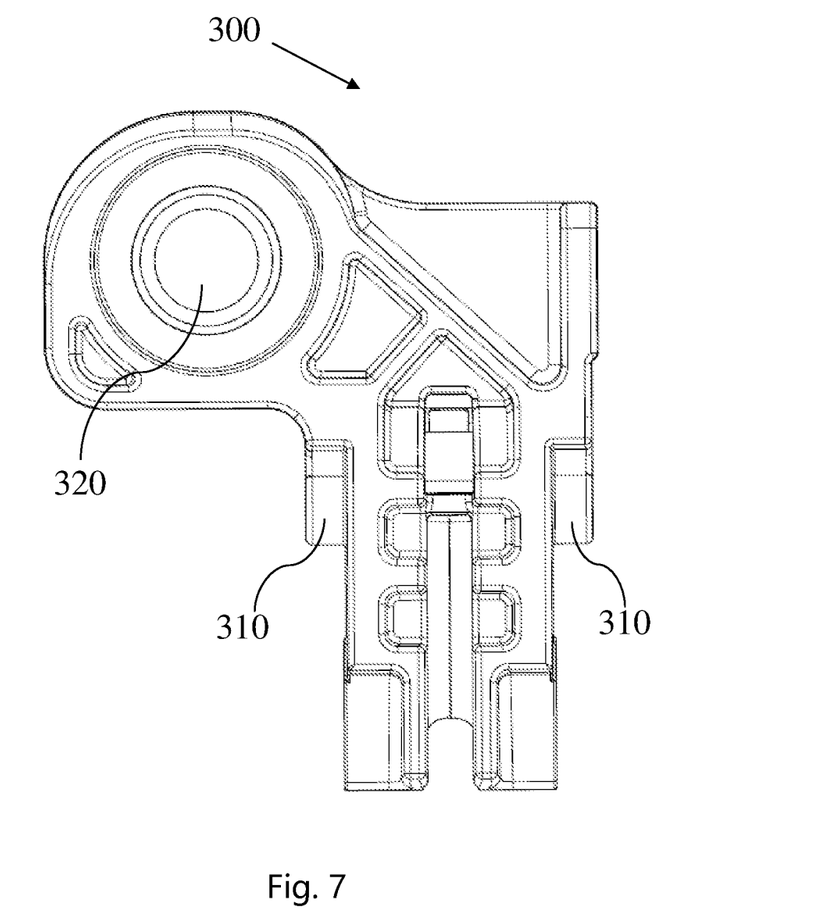
FIG. 7 is a bottom view of the head 300 in FIG. 1.
Figure 8:
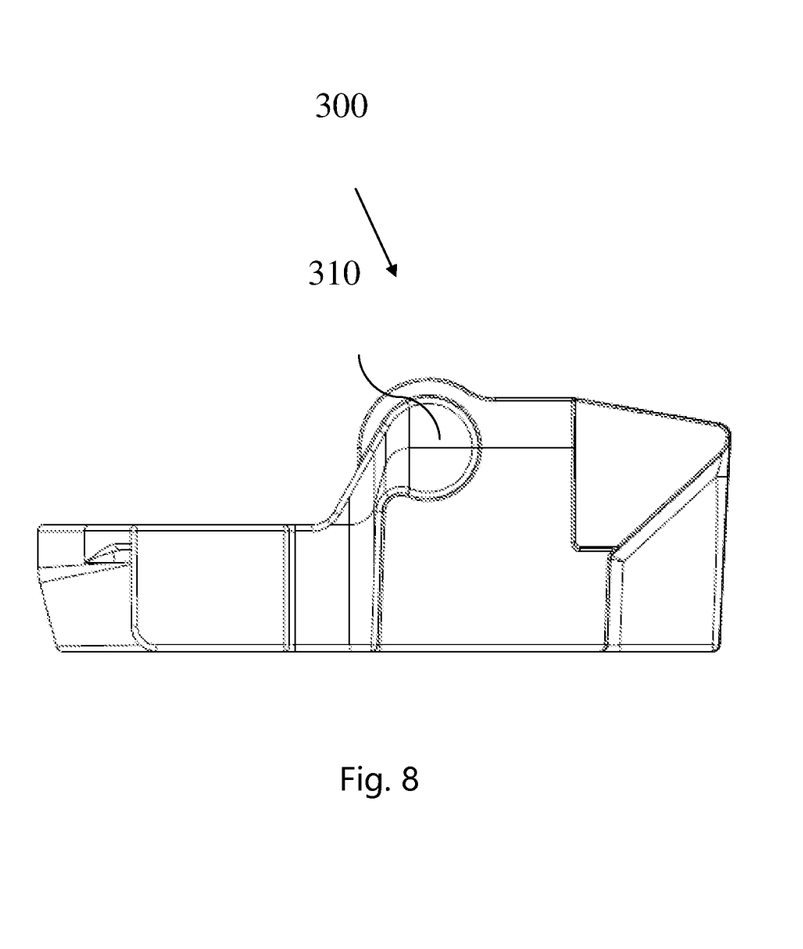
FIG. 8 is a side view of the head 300 in FIG. 1.

FIGS. 7 and 8 respectively show a bottom view and a side view of the head 300 of FIG. 1. As shown in FIG. 7 and FIG. 8, two cylindrical lugs 310 are provided on two sides of the head 300, and cooperate with the two U-shaped slots 131 and 131' on the rear wiper arm 100 such that the head 300 is hinged to the rear wiper arm 100.

In one example, as shown in FIG. 1, the rear wiper assembly 10 may further comprise a wiper blade 400, attached to the rear wiper arm 100 and used for wiping rainwater or dust off the rear windshield; and a spring 500, connected between the rear wiper arm 100 and the head 300 and used to press the wiper blade 400 tightly against the rear windshield.

In one example, as shown in FIGS. 5 and 6, the rear wiper assembly 10 may further comprise a drive motor 600. As shown in FIG. 7, the head 300 comprises a connecting hole 320, and the head 300 may be connected to an output shaft of the drive motor 600 via the connecting hole 320 and a nut.

The present invention is not limited to the structure described above; various other variants could also be used. Although the present invention has already been described by means of a limited number of embodiments, those skilled in the art could, drawing benefit from this disclosure, design other embodiments which do not depart from the scope of protection of the present invention disclosed herein. Thus, the scope of protection of the present invention should be defined by the attached claims alone.

What is claimed is:

1. A rear wiper assembly, comprising:
a rear wiper arm; a cover; a head; and a stop mechanism; the head and the cover being hinged to a rear end of the rear wiper arm;
    wherein the stop mechanism includes a first interference element disposed on the rear wiper arm that extends laterally from a hinge shaft thereof and
    a second interference element that extends from an interior surface of the cover;
    the second interference element located in-line between and spaced apart from two claw-shaped parts that extend from sidewalls of the cover;
    wherein the first interference element and the second interference element interfere with each other such that the cover is prevented from flipping in the direction of the head when the cover is in an open state and when the cover has an angle between an upper surface and an upper surface of the rear wiper arm that is within a predetermined angular range;
    wherein the cover encloses the head when the cover is in a closed state.

2. The rear wiper assembly of claim 1, wherein the hinge shaft of the wiper arm and a hinge shaft of the head are different segregate structures.

3. The rear wiper assembly of claim 2, wherein the hinge shaft of the wiper arm is provided on the upper surface of the rear wiper arm;
    wherein the two claw-shaped parts extend perpendicularly from the upper surface of the cover;
    slots complementing the hinge shaft of the wiper arm are provided in the claw-shaped parts; and rotation of the two claw-shaped parts around the hinge shaft of the wiper arm are adapted to drive the cover to flip.

4. The rear wiper assembly of claim 3, wherein the second interference element is disposed on the upper surface of the cover.

5. The rear wiper assembly as claimed in claim 3, wherein two U-shaped slots are provided in sidewalls of the rear wiper arm, and the hinge shaft of the head is defined by two cylindrical lugs that are provided on two sides of the head, the U-shaped slots cooperating with the lugs such that the head is hinged to the rear wiper arm.

6. The rear wiper assembly as claimed in claim 1, wherein the predetermined angular range is 85-90 degrees.

7. The rear wiper assembly as claimed in claim 1, wherein an amount of interference between the first interference element and the second interference element is 0.2 mm.

8. The rear wiper assembly as claimed in claim 1, wherein the first interference element has a triangular cross section, and the second interference element has a trapezoidal cross section.

9. The rear wiper assembly of claim 1, wherein the hinge shaft of the wiper arm and a hinge shaft of the head are the same structure.

10. The rear wiper assembly of claim 1, further including: a wiper blade, the wiper blade being attached to the rear wiper arm; a spring, the spring being connected between the rear wiper arm and the head.

11. The rear wiper assembly of claim 10, further including: a drive motor, where the head includes a connecting hole for connecting to an output shaft of the drive motor.

* * * * *